United States Patent
Hirose

(10) Patent No.: US 9,819,979 B2
(45) Date of Patent: Nov. 14, 2017

(54) VIDEO DATA PROCESSING APPARATUS

(71) Applicant: FUJITSU LIMITED, Kawasaki-shi, Kanagawa (JP)

(72) Inventor: Tomonori Hirose, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/055,224

(22) Filed: Feb. 26, 2016

(65) Prior Publication Data

US 2016/0286254 A1 Sep. 29, 2016

(30) Foreign Application Priority Data

Mar. 27, 2015 (JP) .................................. 2015-066658

(51) Int. Cl.
| | |
|---|---|
| H04N 21/24 | (2011.01) |
| H04N 21/2187 | (2011.01) |
| H04N 21/239 | (2011.01) |
| H04N 21/8547 | (2011.01) |
| H04N 21/234 | (2011.01) |
| H04N 21/6437 | (2011.01) |
| H04N 21/235 | (2011.01) |
| H04N 21/231 | (2011.01) |
| G11B 27/00 | (2006.01) |

(52) U.S. Cl.
CPC ......... *H04N 21/2407* (2013.01); *G11B 27/00* (2013.01); *H04N 21/2187* (2013.01); *H04N 21/2353* (2013.01); *H04N 21/2393* (2013.01); *H04N 21/23113* (2013.01); *H04N 21/23406* (2013.01); *H04N 21/6437* (2013.01); *H04N 21/8547* (2013.01)

(58) Field of Classification Search
CPC combination set(s) only.
See application file for complete search history.

(56) References Cited

U.S. PATENT DOCUMENTS

| | | | |
|---|---|---|---|
| 2005/0281204 A1 | 12/2005 | Karol et al. | |
| 2007/0242773 A1 | 10/2007 | Li et al. | |
| | (Continued) | | |

FOREIGN PATENT DOCUMENTS

| | | |
|---|---|---|
| JP | 2006-5942 | 1/2006 |
| JP | 2009-534928 | 9/2009 |

OTHER PUBLICATIONS

Korean Office Action dated Jan. 24, 2017 for corresponding Korean Patent Application No. 10-2016-0024636, with Partial English Translation, 9 pages.

*Primary Examiner* — Mulugeta Mengesha
(74) *Attorney, Agent, or Firm* — Fujitsu Patent Center

(57) ABSTRACT

A video data processing apparatus including a file creation unit that creates a file including video packets that is received from a video source, an index creation unit that creates an index file including a sequence number and offset position information, indicating a position in the created file, of each of the video packets included in the created file, and a complementary data creation unit that creates, when there is a loss of a video packet in the created file, complementary data for complementing the loss of the video packet, based on the index file of the created file and an index file of another file including video packets received from the video source by a path different from a path of the video packets included in the created file.

12 Claims, 15 Drawing Sheets

(56) References Cited

U.S. PATENT DOCUMENTS

| | | | | |
|---|---|---|---|---|
| 2009/0276686 A1* | 11/2009 | Liu | ................... | H04L 1/0041 |
| | | | | 714/776 |
| 2010/0031086 A1* | 2/2010 | Leppard | .............. | G06F 11/2094 |
| | | | | 714/15 |
| 2010/0118722 A1* | 5/2010 | Lu | ............................ | H04J 3/24 |
| | | | | 370/252 |
| 2015/0026542 A1* | 1/2015 | Brennum | .............. | H04L 65/605 |
| | | | | 714/776 |
| 2015/0365454 A1* | 12/2015 | Chao | ...................... | H04L 65/60 |
| | | | | 709/219 |

* cited by examiner

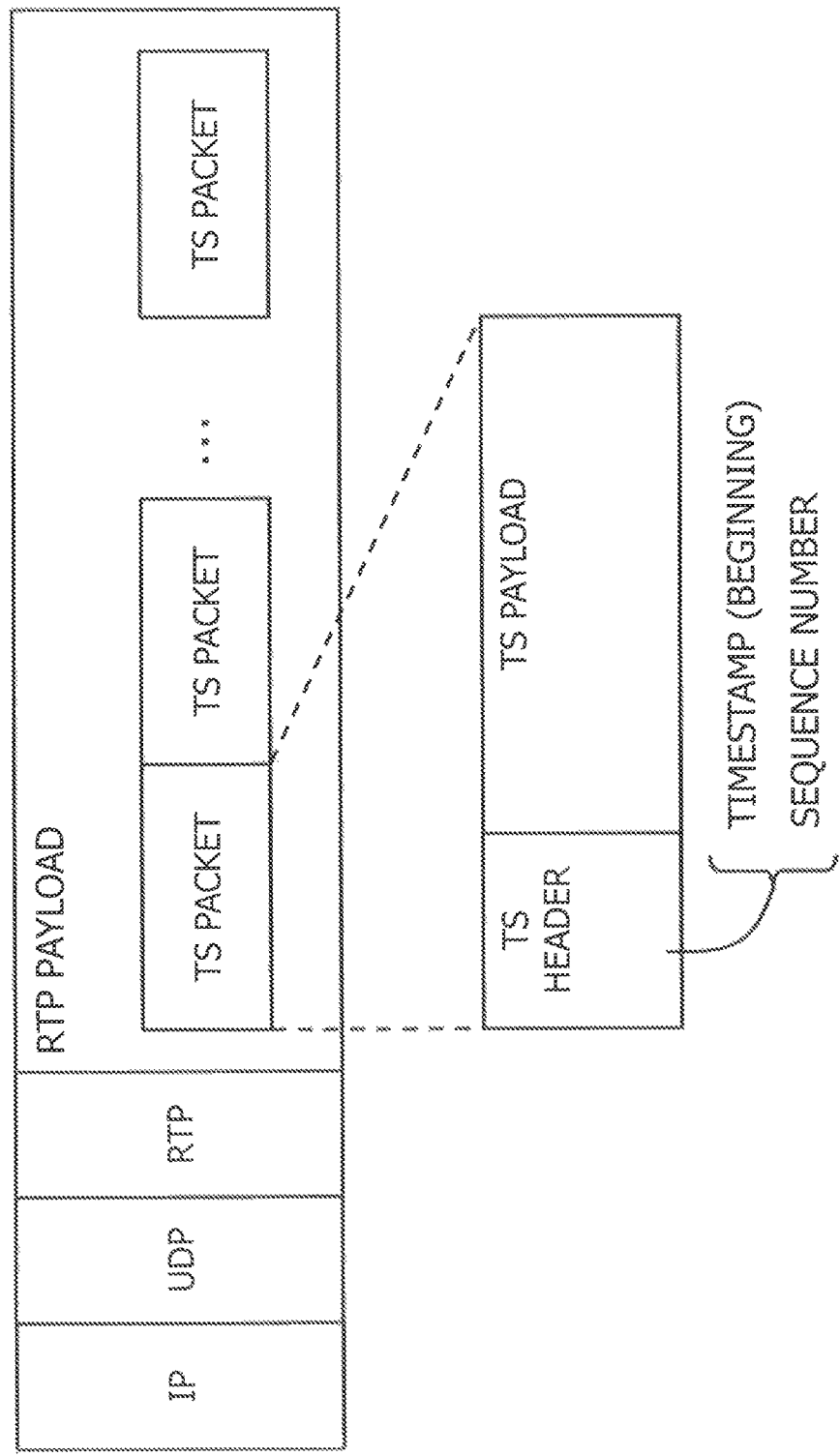

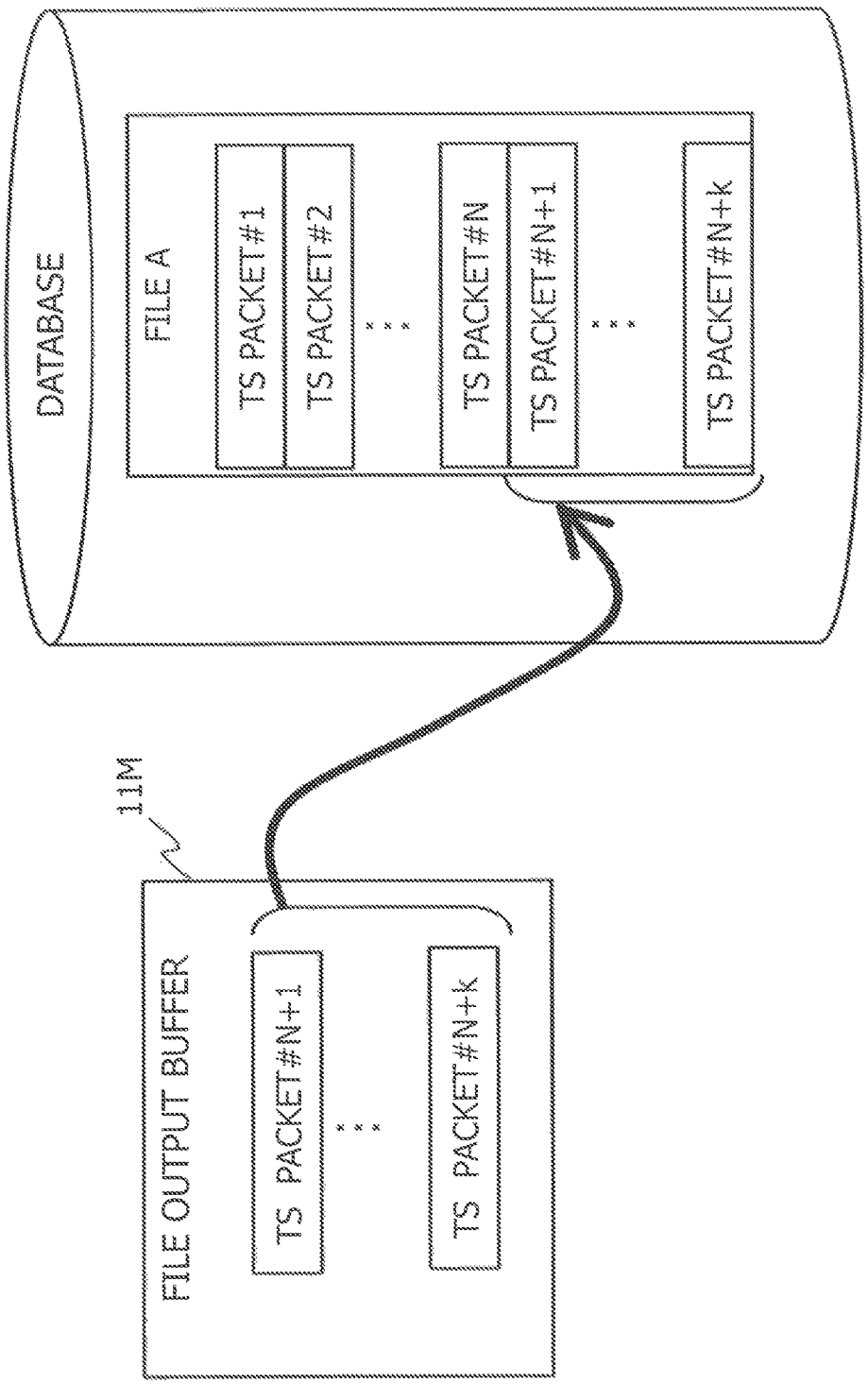

FIG.8

| INDEX FILE | | |
|---|---|---|
| ACCUMULATION INFORMATION | NUMBER OF TSs | NUMBER OF TSs IN FILE |
| | FILE SIZE (UNITS OF BYTES) | SIZE OF STREAM (.mpg) |
| TS INFORMATION 1 | TS TIME | ELAPSED TIME FROM TS AT BEGINNING OF FILE |
| | SEQUENCE NUMBER | CREATED BY ENCODER |
| | OFFSET | NUMBER OF BYTES FROM TS AT BEGINNING OF FILE |
| | TIMESTAMP | VALUE OBTAINED BY CONVERTING TIMESTAMP OF TTS INTO CLOCK FREQUENCY OF ACCUMULATION SERVER |
| TS INFORMATION 2 | | |
| TS INFORMATION 3 | | |

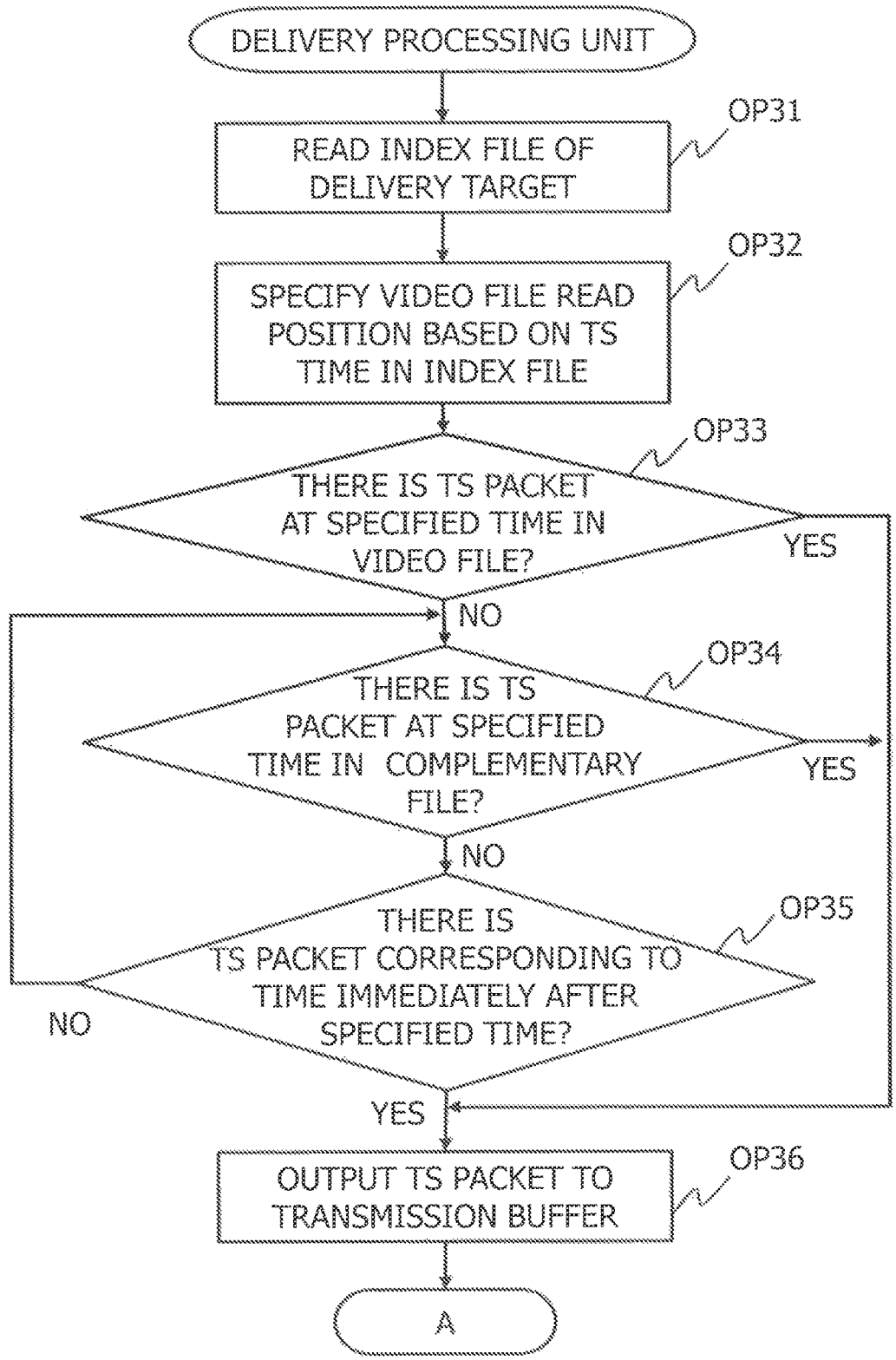

VIDEO DATA PROCESSING APPARATUS

CROSS-REFERENCE TO RELATED APPLICATION

This application is based upon and claims the benefit of priority of the prior Japanese Patent Application No. 2015-066658, filed on Mar. 27, 2015, the entire contents of which are incorporated herein by reference.

FIELD

The present invention relates to a video data processing apparatus, a video data processing system, a video data processing method, and a video data processing program for accumulating video data.

BACKGROUND

For example, a broadcast station has fixed-point observation cameras, such as so-called weather cameras, installed at various locations. A video of each fixed-point observation camera is transmitted to a data center by streaming delivery, and is accumulated in the data center. For example, in the event of natural disasters such as earthquakes, tsunamis and eruptions, or at the time of investigation of a crime or the like, VOD (Video on Demand) distribution is performed by reading video data of a specified time from video data, of a fixed-point observation camera, accumulated in the data center. In many cases, reliability of video data of a fixed-point observation camera is secured by the data being held by a plurality of storage devices according to a redundant configuration of the system.

FIG. 1 is a diagram illustrating an example of a video data accumulation system. A video data accumulation system 100 is an example where a redundant configuration is adopted by a data center, and where video data is held by different storage devices. The video data accumulation system 100 includes a data center 61 and an encoder 50 that are connected over the Internet. For example, the encoder 50 is a fixed-point observation camera. For example, the encoder 50 encodes video data by MPEG (Moving Picture Experts Group), and successively transmits the data to the data center 61 by using RTP (Real-time Transport Protocol). The RTP is a protocol for transmitting audio and video in a real time. The flow of data that is streamed from a predetermined source to a predetermined destination is called a stream.

The data center 61 is a data center of a broadcast station, for example. The data center 61 includes a relay server 70, an accumulation server A, an accumulation server B, a file server A, and a file server B. Additionally, in the case of not distinguishing between the accumulation servers A and B, they will be written as "accumulation server(s) 1". In the case of not distinguishing between the file servers A and B, they will be written as "file server(s) 2". The accumulation server A and the accumulation server B are servers installed at different locations. The accumulation servers A and B may use a common file server 2 or different file servers 2.

According to the video data accumulation system 100 illustrated in FIG. 1, there is one path between the encoder 50 and the data center 61, and video data is transmitted along this one path. The video data is duplicated, in the data center 61, by the relay server 70, and is transferred to each of the accumulation servers A and B. The accumulation servers A and B accumulate, as files, the video data in the file servers A and B, respectively. Files of the video data received by the accumulation servers A and B are illustrated in FIG. 1 as files A and B.

FIG. 2 is a diagram illustrating an example of the video data accumulation system. A video data accumulation system 200 is a configuration where the paths from an encoder to a data center and accumulation servers are made redundant.

The video data accumulation system 200 includes a data center 62 and an encoder 50 that are connected over the Internet. The data center 62 includes an accumulation server A and an accumulation server B. The accumulation servers A and B are installed at different locations.

According to the video data accumulation system 200, the encoder 50 has different paths for the accumulation servers A and B, and transmits the same video data along the respective paths. The accumulation servers A and B accumulate the received video data in the file servers A and B as files A and B, respectively.

Patent Document

[Patent document 1] National Publication of International Patent Application No. 2009-534928

[Patent document 2] Japanese Patent Laid-Open No. 2006-5942

However

However, the redundant configurations of the video data accumulation systems illustrated in FIGS. 1 and 2 have the following problem. FIG. 3 is a diagram illustrating an example of a problem of a redundant configuration of a video data accumulation system. In FIG. 3, the accumulation servers A and B in the data center 61, 62, and a file A in the file server A and a file B in the file server B are extracted and illustrated.

The RTP, which is used for transmission of video data, uses UDP (User Datagram Protocol) as a protocol of a transport layer, and the UDP is a protocol which does not guarantee arrival. Accordingly, an RTP packet of video data may possibly go missing due to packet loss during transmission. Packet loss is one cause of reduced video quality.

Accordingly, due to the influence of packet loss during transmission, the video data included in the files A and B is not necessarily the same as the original video data transmitted from the encoder 50. Also, since the path of video data is different for the file A and the file B, the packet that is lost due to packet loss is possibly different, and the file A and the file B are not necessarily the same.

In the example illustrated in FIG. 3, RTP packets #3 and #4 are lost for the file A. For the file B, RTP packets #2 and #5 are lost. That is, both the file A and the file B are different from the original video data transmitted by the encoder 50. Also, the file A and the file B are different from each other.

Since encoded video data is transmitted from the encoder 50, encoded data is included in the files A and B. At the time of determination of the video quality of the files A and B, the encoded data is decoded, and thus the processing load regarding the accumulated data possibly becomes great. Accordingly, it is difficult to determine which of the files A and B is the video data of higher quality. Therefore, even if the file B is the file of higher video quality with less lost packets, the file A is possibly read depending on the pre-setting.

SUMMARY

According to an aspect, a video data processing apparatus includes a file creation unit that creates a file including video packets received from a video source, an index creation unit that creates an index file including a sequence number and offset position information, indicating a position in the created file, of each of the video packets included in the created file, and a complementary data creation unit that creates, when there is a loss of a video packet in the created file, complementary data for complementing the loss of the video packet, based on the index file of the created file and an index file of another file including video packets received from the video source by a path different from a path of the video packets included in the created file.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating a structure of an RTP packet for transmitting video data;

FIG. 7 is a diagram illustrating an example of video file creation processing by an accumulation unit;

FIG. 8 is a diagram illustrating an example structure of an index file;

FIG. 13A is an example of a flow chart of processing by the delivery processing unit of the accumulation server;

DESCRIPTION OF EMBODIMENT

Hereinafter, an embodiment of the present invention will be described with reference to the drawings. The configuration of the embodiment described below is merely an example, and the present invention is not limited to the configuration of the embodiment.

First Embodiment

Figure 1:
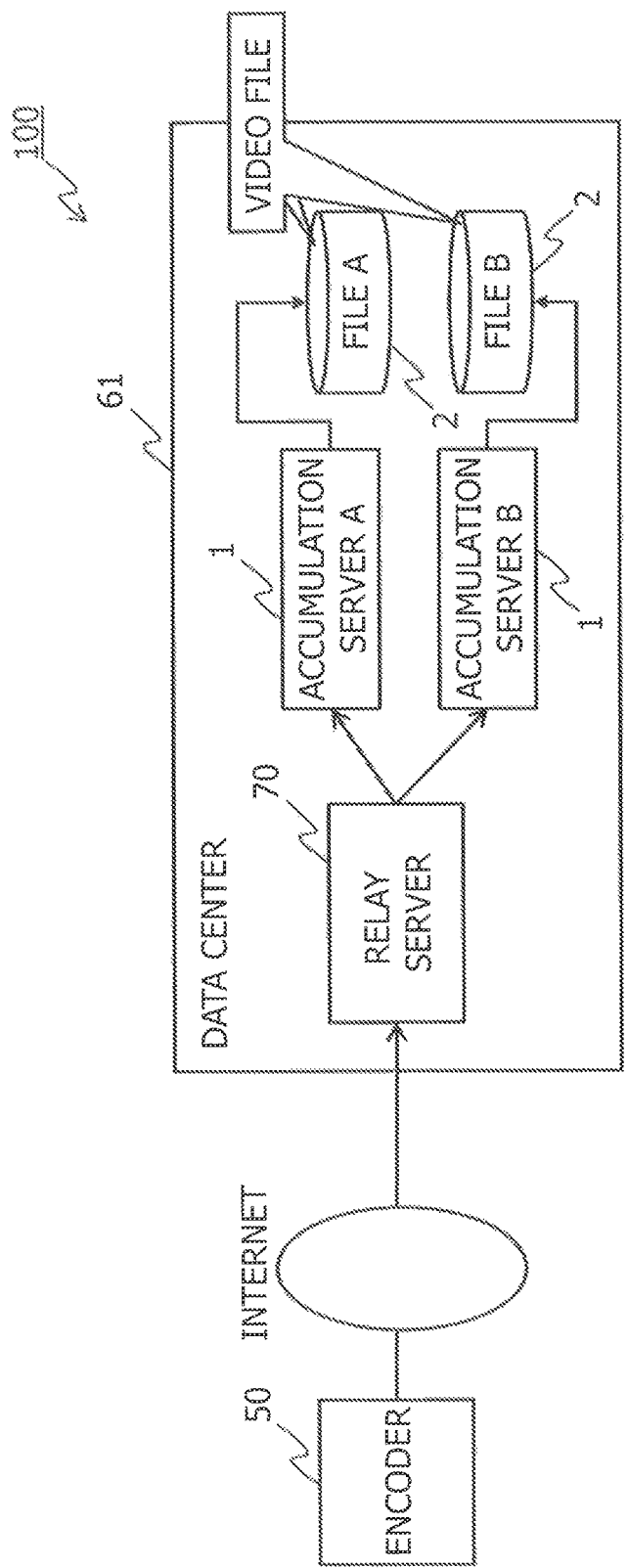
FIG. 1 is a diagram illustrating an example of a video data accumulation system.
Figure 2:
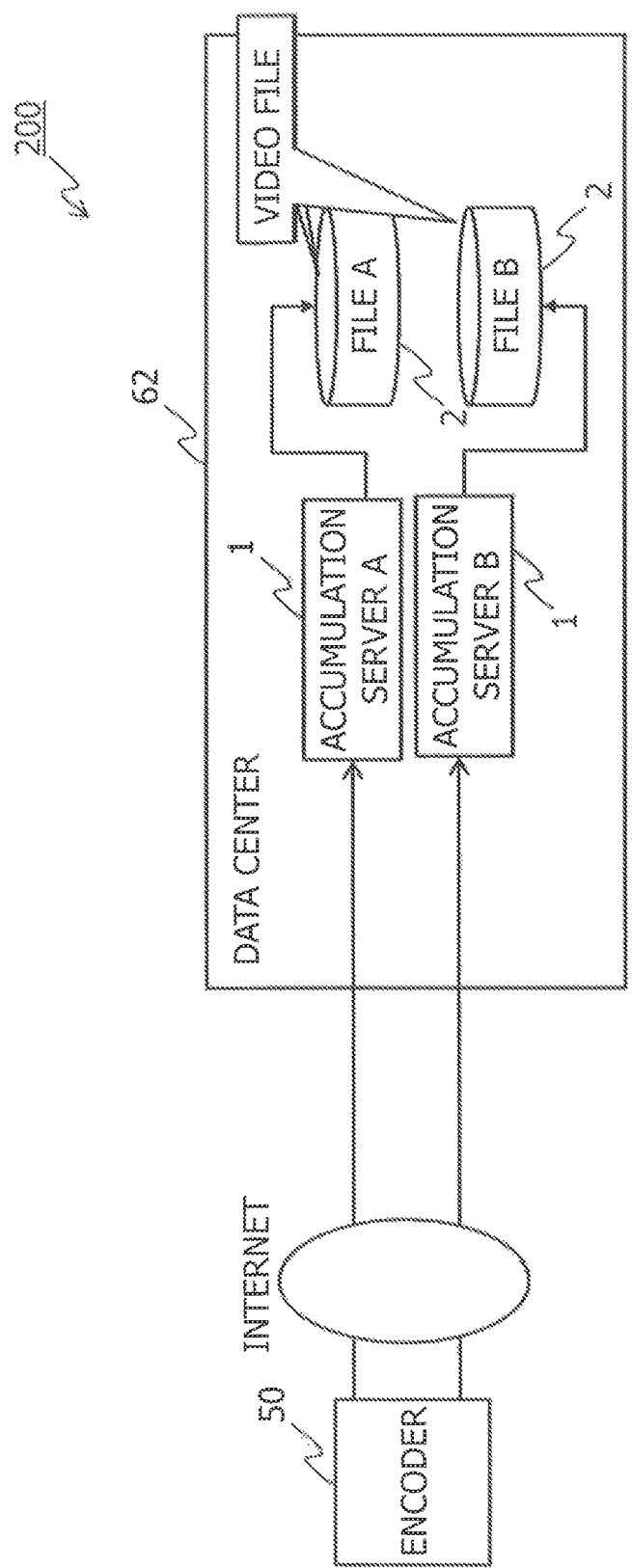
FIG. 2 is a diagram illustrating an example of the video data accumulation system.
Figure 3:
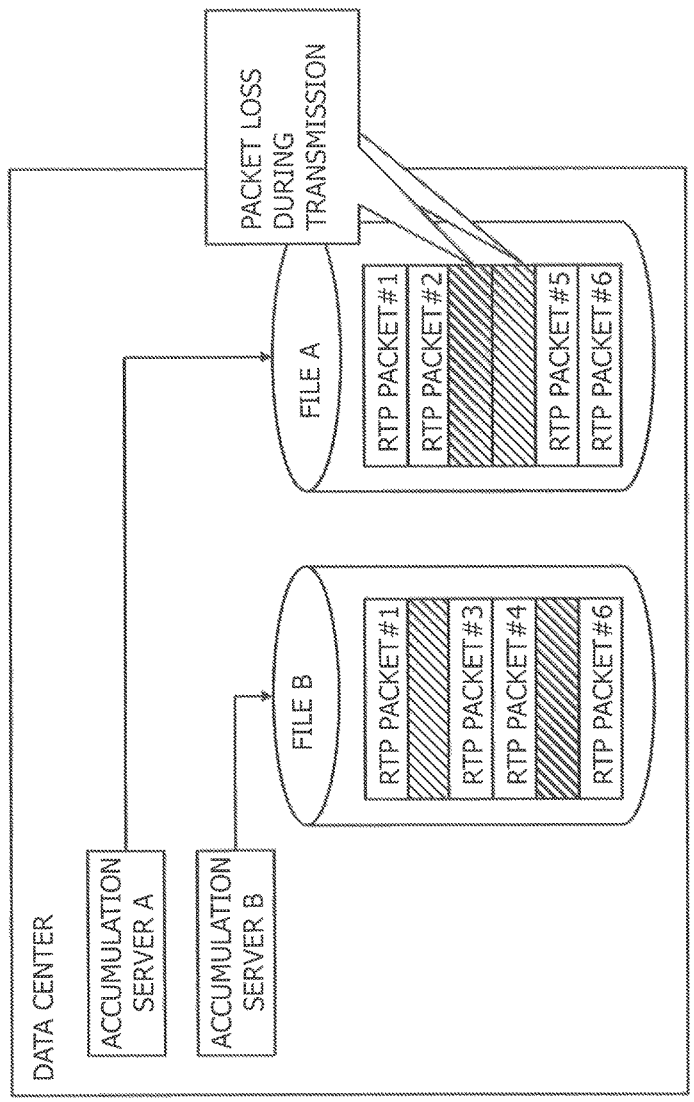
FIG. 3 is a diagram illustrating an example of a problem of a redundant configuration of the video data accumulation system.

A system configuration of a video data accumulation system may be that of the video data accumulation system illustrated in FIG. 1 or 2, for example. In the first embodiment, the video data accumulation system 200 illustrated in FIG. 2 is assumed. An encoder 50 is, for example, a fixed-point observation camera, and is operating at all times. Also, the encoder 50 performs streaming delivery to accumulation servers A and B. In the first embodiment, streaming delivery means that video data captured by a fixed-point observation camera or the like is encoded by the encoder 50, and that transmission of the encoded data is performed at the time point of the encoded data being transferred to the hard disk or the like of the encoder 50.

For example, the accumulation servers A and B create respective files A and B including video packets received, through different paths, from one encoder 50 by streaming delivery. Sequence numbers are added to the video packets by the encoder 50. The accumulation servers A, B generate, for the respective files A, B, index files including the sequence numbers of the video packets included in the files A, B, and offset position information indicating the position, inside the files A, B, from the beginning.

The accumulation servers A, B specify, based on the index files of the files A, B, video packets in the files A, B which have been lost, based on the portions where the sequence numbers are not continuous. In the following, a video packet which has been lost will be simply referred to as a lost packet. The accumulation servers A, B acquire the offset position information of the lost packets in the files A, B from the index files of the files B, A, and acquire the video packets corresponding to the acquired offset position information from the files B, A.

The accumulation servers A, B create complementary files A-1, B-1 of the respective files A, B by the video packets, corresponding to the lost packets, acquired from the files B, A.

Accordingly, regardless of which of the files A and B is read, the original video data transmitted from the encoder 50 may be reproduced by the lost packet being read from the complementary file A-1 or B-1.

In the first embodiment, the encoder 50 is assumed to encode video data by using MPEG. Also, the encoder 50 is assumed to transmit video data by using RTP.

The encoder 50 is an example of a "video source". The accumulation servers A and B are examples of a "video data processing apparatus". The video data accumulation systems 100 and 200 are examples of a "video data processing system".

<Device Configuration>

Figure 4:
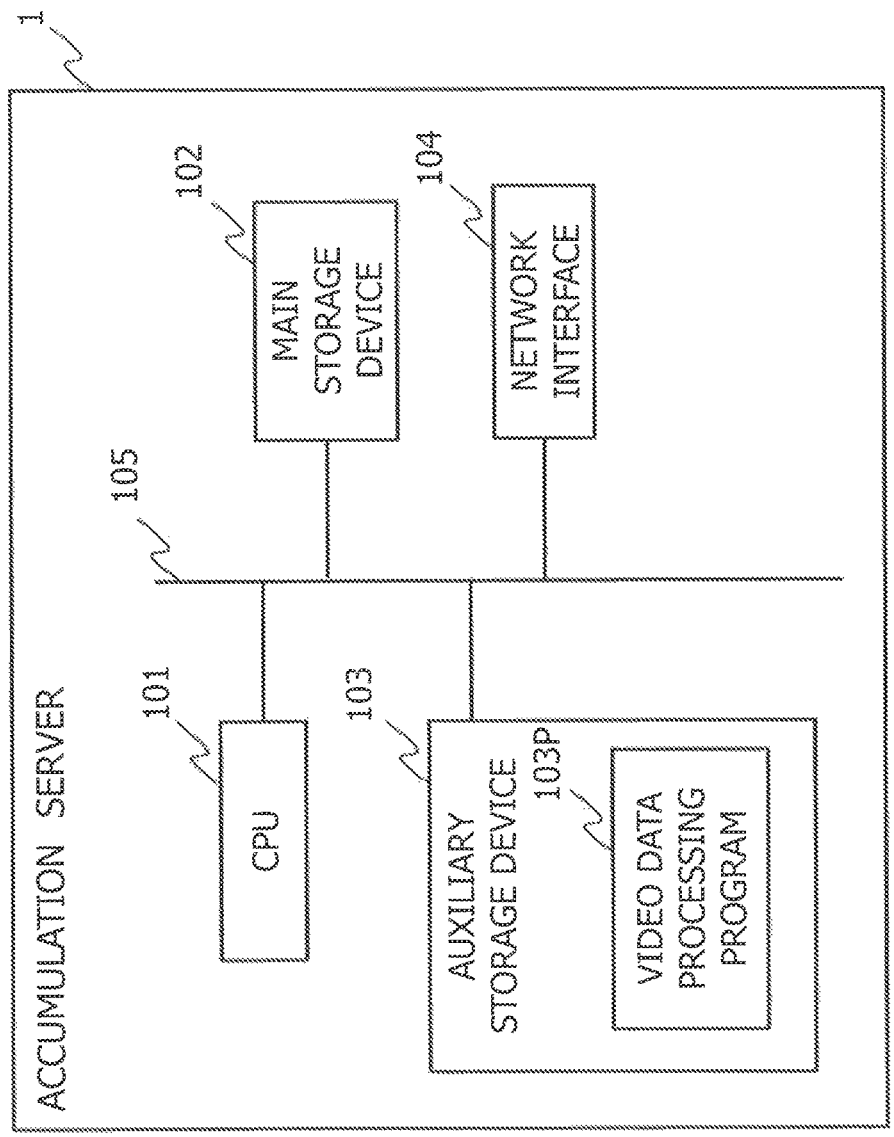
FIG. 4 is a diagram illustrating an example hardware configuration of an accumulation server.

FIG. 4 is a diagram illustrating an example hardware configuration of an accumulation server 1. The accumulation server 1 is a dedicated or general-purpose computer, for example. The accumulation server 1 includes a CPU (Central Processing Unit) 101, a main storage device 102, an auxiliary storage device 103, and a network interface 104. Also, these are electrically interconnected by a bus 105.

The auxiliary storage device 103 stores various programs, and data to be used by the CPU 101 at the time of execution of each program. The auxiliary storage device 103 is a non-volatile memory such as a hard disk drive, for example. The auxiliary storage device 103 holds an operating system (OS), a video data processing program 103P, and other various application programs, for example. The video data processing program 103P is a program for acquiring a lost packet of a file from another file, and for creating complementary data.

The main storage device 102 provides the CPU 101 with a work area and a storage area for loading a program stored in the auxiliary storage device 103, or is used as a buffer. The main storage device 102 includes a semiconductor memory such as a RAM (Random Access Memory), for example.

The CPU 101 performs various processes by loading, on the main storage device 102, and executing the OS and various application programs held by the auxiliary storage device 103. The number of CPUs 101 is not limited to one, and a plurality of CPUs 101 may be provided.

The network interface 104 is an interface for performing input/output of a signal to/from a network. The network interface 104 includes an interface for connecting to a wired network, and an interface for connecting to a wireless network. In the case of connecting to a wired network, the network interface 104 is a light signal circuit, or an NIC (Network Interface Card), for example. In the case of connecting to a wireless network, the network interface 104 is a satellite signal receiving circuit or the like. Data or the like received by the network interface 104 is output to the CPU 101.

Additionally, the hardware configuration of the accumulation server 1 illustrated in FIG. 4 is merely an example and is not restrictive, and structural elements may be omitted, replaced or added as appropriate according to the embodiment. For example, the accumulation server 1 may include a removable recording medium drive device, and may execute a program recorded in a removable recording medium. The removable recording medium is a recording medium such as an SD card, a mini SD card, a micro SD card, a USB (Universal Serial Bus) flash memory, a CD (Compact Disc), a DVD (Digital Versatile Disc), a Blu-ray (registered trademark) Disc, or a flash memory card.

Figure 5:
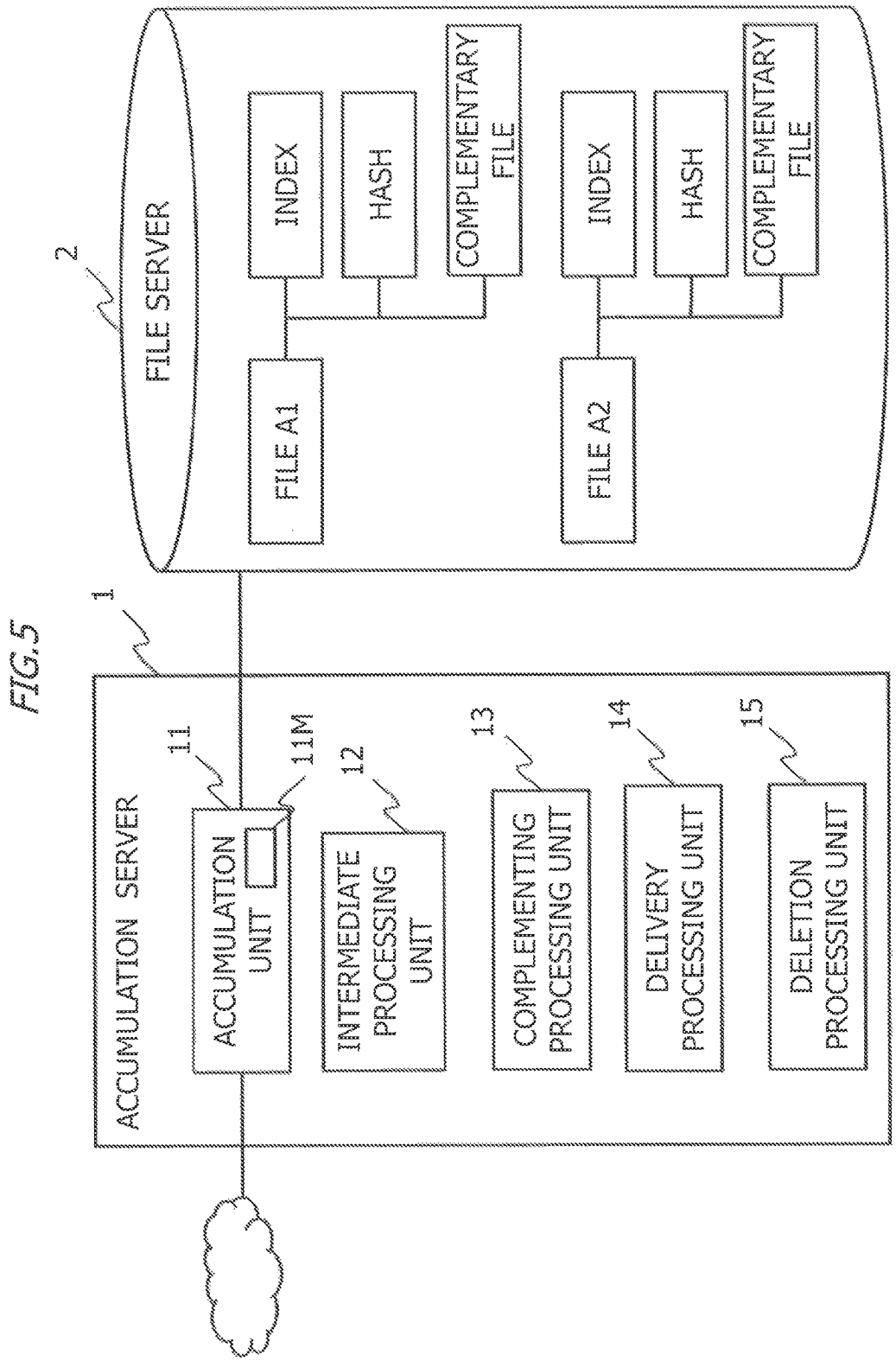
FIG. 5 is a diagram illustrating an example functional configuration of the accumulation server.

FIG. 5 is a diagram illustrating an example functional configuration of the accumulation server 1. As the functional configuration, the accumulation server 1 includes an accumulation unit 11, an intermediate processing unit 12, a complementing processing unit 13, a delivery processing unit 14, and a deletion processing unit 15. The accumulation unit 11, the intermediate processing unit 12, the complementing processing unit 13, the delivery processing unit 14, and the deletion processing unit 15 are a functional configuration achieved by the CPU 101 executing a video data processing program 103P.

The accumulation server 1 is connected to a file server 2. The file server 2 is a server for executing a file sharing protocol of a NAS (Network Attached Storage) or a CIFS (Common Internet File System), for example.

The accumulation unit 11 continuously receives RTP packets from the encoder 50. The accumulation unit 11 divides the received video data based on timestamps added to the video data into predetermined time length units from a predetermined reference time, and takes the video data included in a divided predetermined time length as one video file. The predetermined time length may be freely set by an administrator of the data center 62 between 30 minutes to one day, for example. A video file has an amount of data corresponding to the time length of the predetermined time slot at the maximum. The video file is stored in the file server 2. The accumulation unit 11 is an example of a "file creation unit".

The accumulation unit 11 performs hash calculation of the video file, and creates hash data. Although not limited, hash calculation is SHA1 (Secure Hash Algorithm 1), MD5 (Message Digest Algorithm 5) or the like, for example. The accumulation unit 11 stores the hash data in the file server 2 by associating the same with the corresponding video file. The accumulation unit 11 is an example of a "hash data creation unit".

The accumulation unit 11 creates an index file for the video file. Details of the index file will be given later. The accumulation unit 11 stores the index file in the file server 2 by associating the same with the corresponding video file. The accumulation unit 11 is an example of an "index creation unit".

The intermediate processing unit 12 acquires hash data of a target video file from the file server 2. Also, the intermediate processing unit 12 acquires, from the corresponding file server 2, hash data of a video file created by another device, the video file being redundant data of the target video file. For example, the intermediate processing unit 12 of the accumulation server A in FIG. 2 acquires hash data of a file A from the file server A, and acquires, from the file server B, hash data of a file B created by the accumulation server B.

The intermediate processing unit 12 compares the two pieces of hash data acquired. For example, in the case where no packet is lost for the file A and the file B in FIG. 2, the pieces of hash data of the file A and file B coincide with each other. However, in the case where packet loss occurs during transmission of video packets included in the file A and the file B in FIG. 2, the file A and the file B do not coincide with each other, and the pieces of hash data of the file A and the file B do not coincide with each other.

Accordingly, in the case where two pieces of hash data acquired do not coincide with each other, the intermediate processing unit 12 determines that there is possibly a missing packet in the video file its owner device has created, and invokes the complementing processing unit 13. In the case where two pieces of hash data acquired coincide with each other, the intermediate processing unit 12 determines that no packet is missing in the video file its owner device has created, and does not invoke the complementing processing unit 13. The intermediate processing unit 12 is an example of a "comparison unit".

Additionally, there is a possibility that the packets that got lost during transmission of video packets included in the file A and the file B in FIG. 2 coincide with each other, and that the hash data of the file A and the hash data of the file B coincide with each other. If the packets that got lost during transmission of video packets included in the file A and the file B coincide with each other, it is not possible to complement the lost packet of one file by the other file. There is also a possibility that, although the packets that got lost during transmission of video packets included in the file A and the file B are different, the hash data of the file A and the hash data of the file B coincide with each other. Since the possibility of such an event happening is very low, such a case is not considered in the first embodiment.

When invoked by the intermediate processing unit 12, the complementing processing unit 13 creates a complementary file for the lost packet of the video file its owner device has created, based on the index file of the video file its owner device has created and the index file of the video file created by another device. Specifically, the complementing processing unit 13 acquires a video packet corresponding to the lost packet of the video file its owner device has created, from the video file created by the other device. The complementing processing unit 13 creates, from the acquired video packet, a complementary file, which is a file different from the corresponding video file. The complementing processing unit 13 associates the complementary file with the corresponding video file, and stores the complementary file in the file server 2. The complementing processing unit 13 is an example of a "complementary data creation unit".

When a delivery request for a video file is received, the delivery processing unit 14 specifies the position, in the video file, of a video packet at the time specified by the delivery request based on the index file, and starts delivery from the specified video packet. The delivery processing unit 14 reads a video packet, in the video file, corresponding to a lost packet from a corresponding complementary file. The delivery processing unit 14 is an example of a "delivery unit".

Of the video file the owner device of the deletion processing unit 15 has created and the video file the other device has created, which is the redundant data of the aforementioned video file, the deletion processing unit 15 deletes the video file of poorer video quality, and its index file, hash data and complementary file. Note, the deletion processing unit 15 is provided to one of the accumulation servers A and B which is set as a master, and is not provided to an accumulation server which is not a master. In the first embodiment, whether the video quality is higher or poorer is determined based on the number of times of occurrence of continuous lost packets. The deletion processing unit 15 is an example of a "deletion unit".

The hardware configuration of the file server 2 is approximately the same as the hardware configuration of the accumulation server 1, and includes a CPU, a main storage device, an auxiliary storage device, and a network interface. The file server 2 reads and writes data of a file or the like according to a request from the accumulation server 1.

The file server 2 may be installed at the same location as the accumulation server 1, or may be installed at a different location. A plurality of file servers 2 are installed at the data center 62, and which of the file server 2 is to be used by the accumulation server 1 is set by the administrator in advance.

According to the first embodiment, a video file, an index file, hash data and a complementary file are stored, by the accumulation server 1, and held as a set in the auxiliary storage device of the file server 2. In the first embodiment, the video file, the index file, the hash data and the complementary file are associated with one another by having a common file name. In the case where video files are created in units of time slots of a time length of one hour, the file name is added in such a way as to indicate the date and the time slot of recording of the video, for example. Also, the video file, the index file, the hash data and the complementary file have different extensions, and determination of a file is enabled by the extension.

Incidentally, the video file, the index file, the hash data and the complementary file do not have to be associated with one another in the above manner. Also, the method of adding a file name is not limited to the above method.

FIG. 6 is a diagram illustrating a structure of an RTP packet for transmitting video data. A plurality of TS (TranSport) packets are stored in a payload portion of an RTP packet. A TS packet is a packet that is created by video data input from a fixed-point camera, for example, being encoded by the encoder 50 by MPEG. A TS packet is an example of a "video packet".

The size of a TS packet is 188 bytes in the case of MPEG-2, for example. Also, in the case where a timestamp is added to a TS packet, the size of the TS packet is 192 bytes, and the packet is referred to as a TTS (Timestamped TS) packet. The timestamp of a TTS packet indicates the time when the TTS packet was created by the encoder 50. In the first embodiment, a TTS packet to which a timestamp is added by the encoder 50 is assumed to be used. Hereinafter, a TS packet and a TTS packet are referred to as TS packet(s) without being distinguished from each other. In the case where a TTS packet is to be distinguished from a TS packet, it will be written as a TTS packet.

An MTU (Maximum Transmission Unit) of an IP packet is 1500 bytes, and thus, theoretically, a maximum of seven TTS packets may be stored in one RTP packet. Additionally, the upper limit of the number of TTS packets to be stored in an RTP packet may be freely set by the administrator.

A timestamp is added to the beginning of a TS packet. One of pieces of information included in the header of a TS packet is a sequence number. According to MPEG-2, the sequence number of a TS packet is indicated by a 4-byte continuity counter. According to the continuity counter, the value is incremented by one, and when the maximum value 16 (0×1111) is reached, the value returns to 0 (0×0000).

If one RTP packet is lost during transmission of video data, a plurality of TS packets stored in the RTP packets are also lost. In the case where six TS packets are included in one RTP packet, if one RTP packet is lost, six TS packets are lost. Accordingly, the sequence numbers of TS packets preceding and following the lost packets in the video file will be, for example, 0 and 7 with six numbers being skipped. In this manner, packet loss may be detected by the discontinuity in the sequence numbers.

FIG. 7 is a diagram illustrating an example of video file creation processing by the accumulation unit 11. The accumulation unit 11 includes a file output buffer 11M. The size of the file output buffer 11M is a size allowing storage of TS packets of a predetermined time length. For example, the size of the file output buffer 11M is a size allowing storage of TS packets amounting to 30 seconds.

When an RTP packet is received, the accumulation unit 11 stores the TS packets stored in the payload portion of the RTP packet in the file output buffer 11M in the order of the sequence number. When the file output buffer 11M becomes full, the accumulation unit 11 adds the TS packets stored in the file output buffer 11M to the end of a latest video file in the file server 2 in the order of the sequence number. When the size of the latest video file reaches the maximum time length, the accumulation unit 11 newly creates a video file, and thereafter, the newly created video file is treated as the latest video file.

FIG. 8 is a diagram illustrating an example structure of the index file. The index file includes accumulation information and TS information.

The accumulation information is overall information about the video file corresponding to the index file. For example, the accumulation information includes the number of TS packets included in the video file corresponding to the index file, and the size of the video file. The size of a file included in the accumulation information is in units of bytes.

The TS information is information about a TS packet included in the video file corresponding to the index file. One piece of TS information is created for one TS packet. That is, the number of pieces of TS information present in the index file is equal to the number of TS packets included in the corresponding video file. The TS information includes a TS time, a sequence number, an offset, and a timestamp, for example.

The TS time included in the TS information is a reproduction start time of the TS packet where the beginning of the video file corresponding to the index file is taken as the base point. The TS time is in units of milliseconds, for example.

The sequence number included in the TS information is the value of the sequence number included in the header of the TS packet. The offset included in the TS information is the number of bytes from the beginning of the video file corresponding to the index file to the TS packet.

The timestamp included in the TS information is the value of the timestamp added to the beginning of the TS packet. In the case where the clock frequency is different between the encoder 50 and the accumulation server 1, the value of the timestamp is converted into the unit of clock frequency of the accumulation server 1.

The index file is created and updated by the accumulation unit 11 at the time of writing of a TS packet in the video file in the file server 2.

Figure 9:
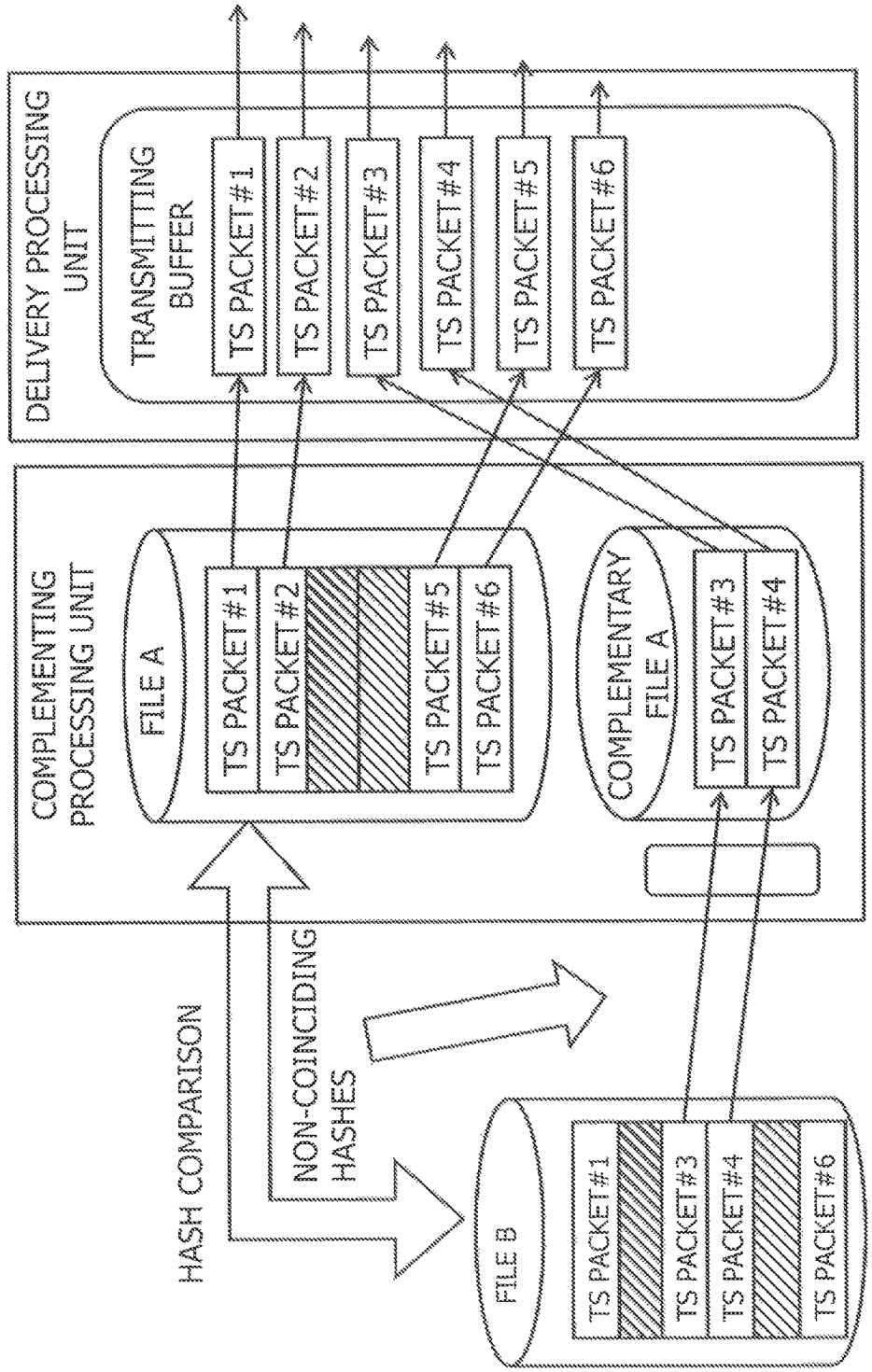
FIG. 9 is a diagram illustrating examples of processing by a complementing processing unit and a delivery processing unit.

FIG. 9 is a diagram illustrating examples of processing by the complementing processing unit 13 and the delivery processing unit 14. FIG. 9 illustrates an example of a case where the accumulation server A in FIG. 2 complements a lost packet of the file A by using the file B. In FIG. 9, the sequence numbers of the TS packets are denoted as #1, #2 and the like for the sake of convenience in the description.

The complementing processing unit 13 specifies a lost packet based on the discontinuity in the sequence numbers of the TS packets in the index file of the file A. In the file A illustrated in FIG. 9, the TS packet following a TS packet #2 is a TS packet #5, and the sequence numbers are discontinuous. Accordingly, loss of TS packets #3 and #4 is specified.

The complementing processing unit 13 refers to the index file of the file B, and determines whether the TS packets #3 and #4, which are the lost packets of the file A, are in the file B. In the example illustrated in FIG. 9, the TS packets #3 and #4 are present in the file B. The complementing processing unit 13 acquires the offsets of the TS packets #3 and #4 from the index file of the file B, and acquires the TS packets #3 and #4 from the positions, in the file B, indicated by the offsets.

The complementing processing unit 13 adds the TS packets #3 and #4 acquired from the file B to a complementary file. Additionally, the complementing processing unit 13 includes a processing buffer, and stores, in the processing buffer, the TS packets acquired from the file B for complementing the lost packets of the file A. When the processing buffer becomes full, or when the complementing process for the target video file is ended, the complementing processing unit 13 stores the TS packets in the processing buffer in the complementary file.

In the case of delivering the file A, the delivery processing unit 14 starts reading from a TS packet, in the file A, at a specified time in a delivery request. For example, if reading is started from the TS packet #1, the delivery processing unit 14 refers to the index file, detects that the TS packet #2 to be read next is in the file A, and reads the TS packet #2 from the file A. Next, the delivery processing unit 14 refers to the index file, detects that the TS packet #3 to be read next is not in the file A, and reads the TS packet #3 from the complementary file. The TS packet #4 is also read from the complementary file in the same manner.

In the case where the file A is to be complemented by inserting a packet, acquired from the file B, at the position of a lost packet of the file A, a process of rewriting the file A is to be performed, and thus the processing load on the accumulation server A possibly becomes great. By creating a complementary file separate from a video file, the file A may be complemented by changing the read destination of a lost packet to the complementary file, and thus the load on the accumulation server 1 may be reduced compared to the process of rewriting the file A.

<Flow of Processing>

Figure 10:
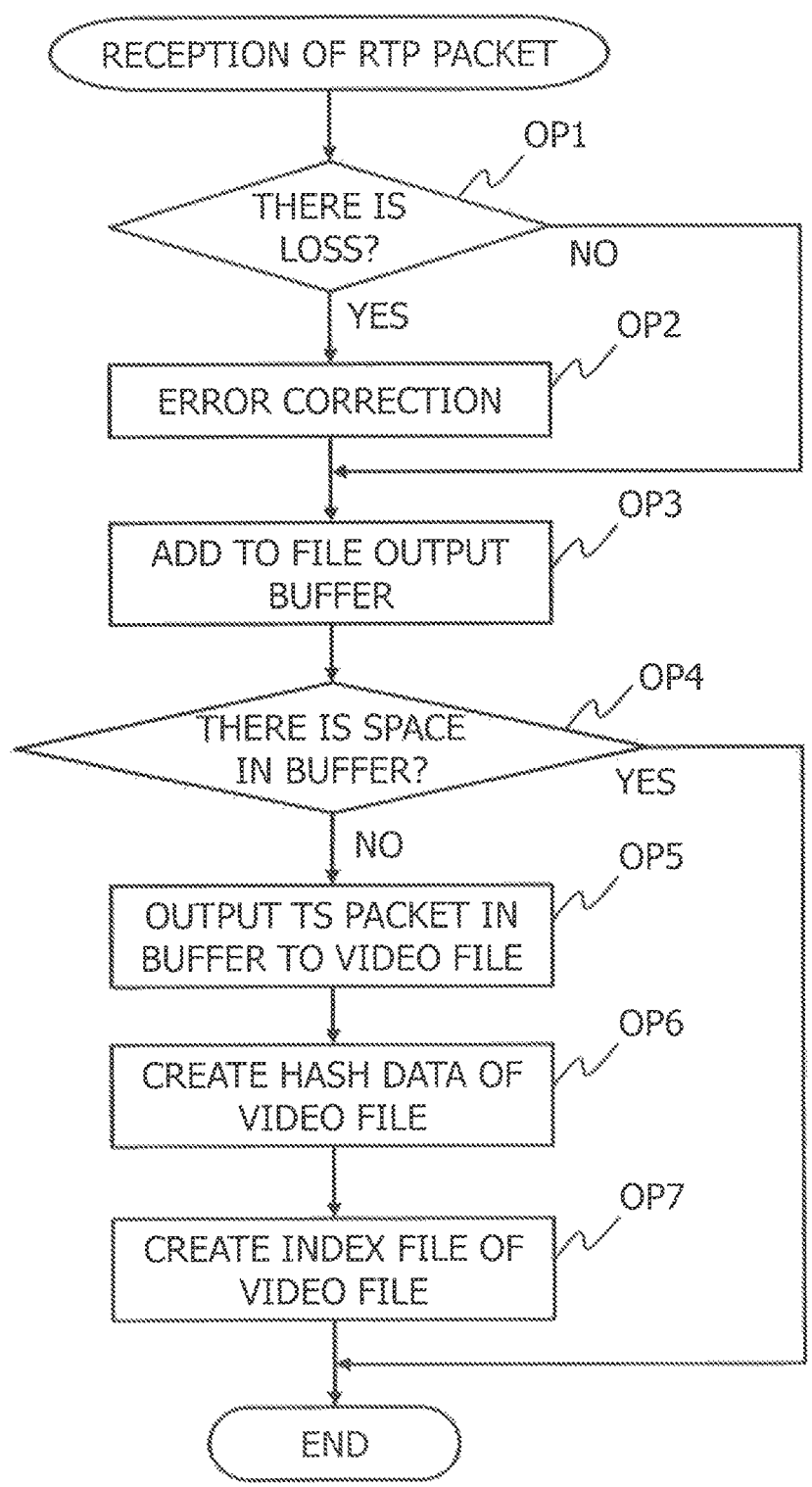
FIG. 10 is an example of a flow chart of processing by the accumulation unit of the accumulation server.

FIG. 10 is an example of a flow chart of processing by the accumulation unit 11 of the accumulation server 1. The processing illustrated in FIG. 10 is started when an RTP packet is received by the accumulation unit 11, for example.

In OP1, the accumulation unit 11 determines whether or not an RTP packet is lost, based on the sequence numbers of the TS packets included in the received RTP packet and the TS packets included in the immediately preceding RTP packet. In the case where loss of an RTP packet is detected (OP1: YES), the process proceeds to OP2. In the case where loss of an RTP packet is not detected (OP1: NO), the process proceeds to OP3.

In OP2, since loss of an RTP packet is detected, the accumulation unit 11 performs error correction. Additionally, in the first embodiment, the encoder 50 performs data transmission using a predetermined error correction coding method, and the accumulation unit 11 may perform restoration of the lost packet according to this predetermined error correction coding method. The error correction coding method is not limited to a specific method, and any known method may be used. Additionally, for example, in the case where packets are lost frequently, lost packets are possibly not restored by the error correction in OP2. Next, the process proceeds to OP3.

In OP3, the accumulation unit 11 extracts TS packets from the received RTP packet, and adds the same in the file output buffer 11M. In the case where a lost packet is restored by the error correction in OP2, the accumulation unit 11 also adds the TS packets extracted from the restored RTP packet to the file output buffer 11M. Next, the process proceeds to OP4.

In OP4, the accumulation unit 11 determines whether or not there is a space in the file output buffer 11M. For example, a threshold is set for the capacity of the file output buffer 11M, and when the capacity of the file output buffer 11M is below the threshold, the accumulation unit 11 determines that there is no space in the file output buffer 11M. The threshold for the capacity of the file output buffer 11M is set to a value equal to or greater than 3000 bytes, for example. This is because the maximum length of an IP packet is 1500 bytes, and also because the packet restored by the error correction in OP2 may be added to the file output buffer 11M in addition to the received packet. Incidentally, the threshold for the capacity of the file output buffer 11M may be freely set by the administrator, and is not particularly limited.

In the case where there is a space in the file output buffer 11M (OP4: YES), the processing illustrated in FIG. 10 is ended. In the case where there is no space in the file output buffer 11M (OP4: NO), the process proceeds to OP5.

In OP5, the accumulation unit 11 adds the TS packets stored in the file output buffer 11M to a latest video file in the file server 2. For example, in the case where the size of the latest video file is a predetermined time length, the accumulation unit 11 newly creates a video file. Then, the process proceeds to OP6.

In OP6, the accumulation unit 11 creates hash data of the video file to which the TS packets have been added in OP5. With respect to an existing video file, a process of overwriting the hash data corresponding to the video file is performed. With respect to a newly created video file, a hash data creation process is performed. Next, the process proceeds to OP7.

In OP7, the accumulation unit 11 creates an index file for the video file to which the TS packets have been added in OP5. With respect to an existing video file, a process of adding the TS information of the TS packets added to the video file, to the index file corresponding to the video file is performed. With respect to a newly created video file, an index file creation process is performed. Then, the processing illustrated in FIG. 10 is ended.

Additionally, the processing illustrated in FIG. 10 is merely an example, and the order of execution of the processes may be changed as appropriate, or processes may be added or removed as appropriate. For example, the order of execution of processes in OP6 and OP7 may be reversed. Also, in the case where the encoder 50 performs data transmission without performing the error correction code process, the processes in OP1 and OP2 do not have to be performed.

Figure 11:
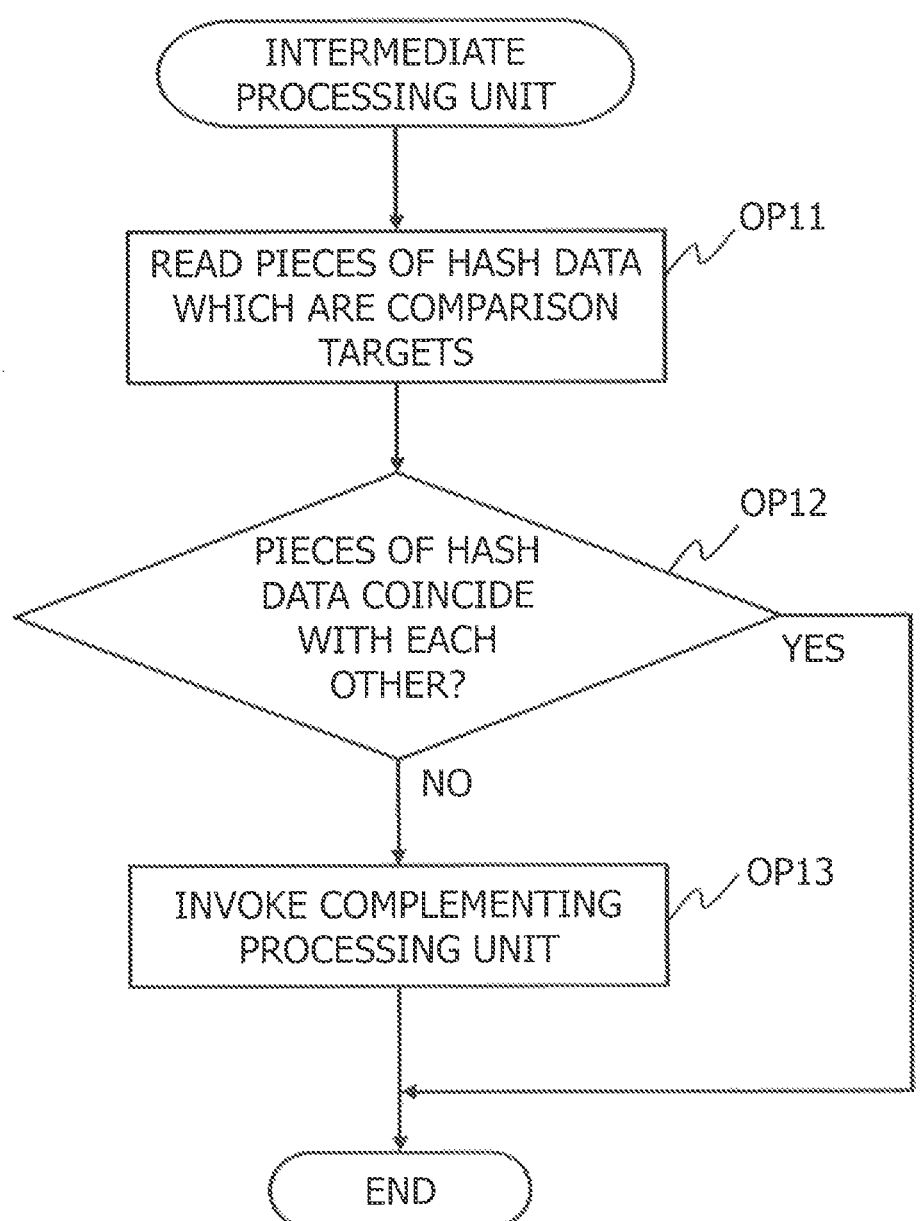
FIG. 11 is an example of a flow chart of processing by an intermediate processing unit of the accumulation server.

FIG. 11 is an example of a flow chart of processing by the intermediate processing unit 12 of the accumulation server 1. The flow chart illustrated in FIG. 11 may be performed for a latest video file at a predetermined cycle, or may be performed at the time of occurrence of a predetermined event. The execution cycle in the case where the flow chart in FIG. 11 is to be performed at a predetermined cycle takes a value smaller than the upper limit time length of a video file. Also, a predetermined event to be the trigger for execution of the flow chart in FIG. 11 is creation of the next new video file after the upper limit time length of a video file is reached, for example.

In OP11, the intermediate processing unit 12 reads pieces of hash data which are comparison targets from corresponding file servers 2. For example, in the system in FIG. 2, both of the accumulation servers A and B read the hash data corresponding to files A and B. Next, the process proceeds to OP12.

In OP12, the intermediate processing unit 12 determines whether the pieces of hash data which are comparison targets coincide with each other or not. In the case where the pieces of hash data which are comparison targets coincide with each other (OP12: YES), the processing illustrated in FIG. 11 is ended. In the case where the pieces of hash data which are comparison targets do not coincide with each other (OP12: NO), the process proceeds to OP13.

In OP13, since the pieces of hash data which are comparison targets do not coincide with each other, the intermediate processing unit 12 determines that a complementing process is to be performed for the video data that is managed by its owner device, and invokes the complementing processing unit 13. Then, the processing illustrated in FIG. 11 is ended.

Figure 12:
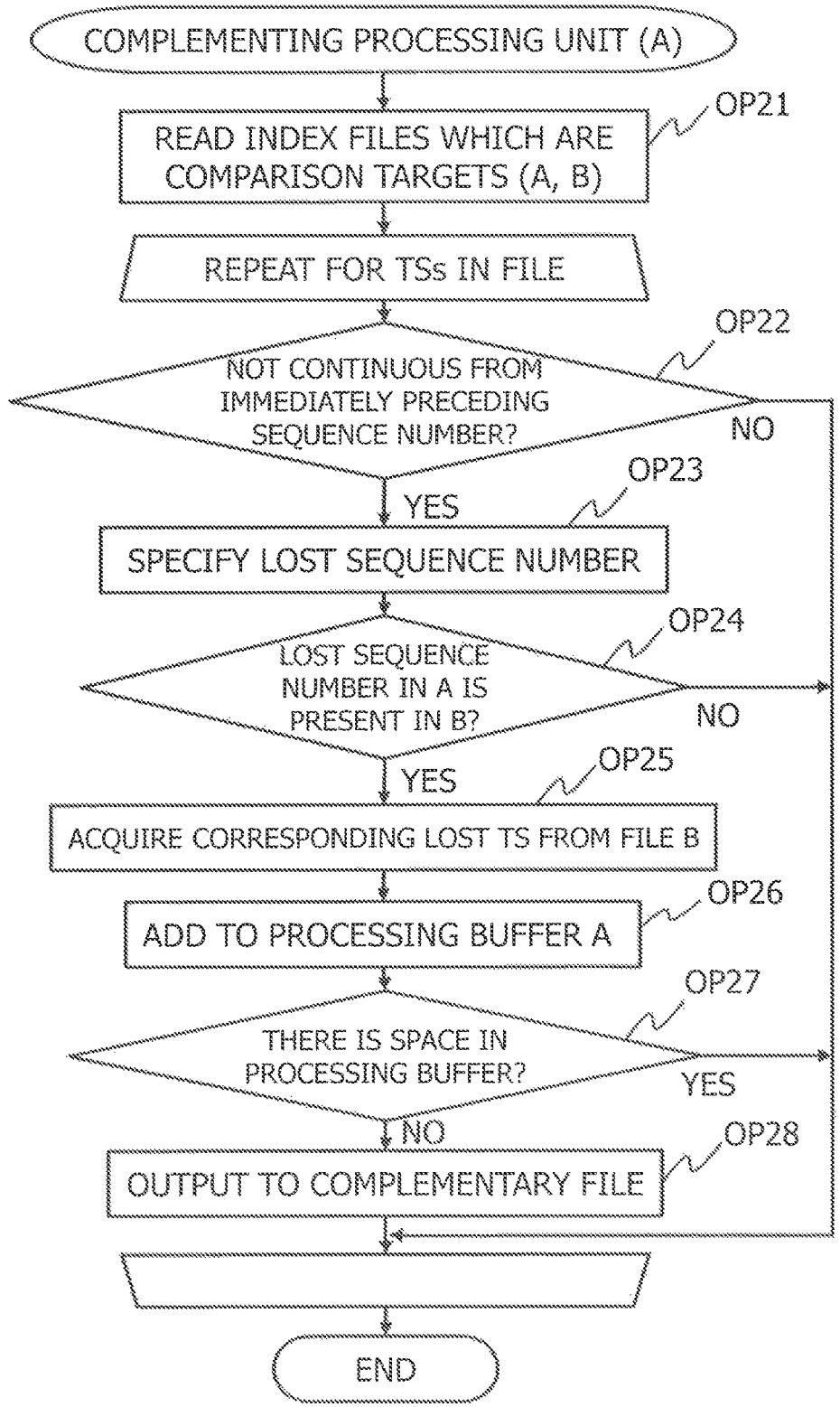
FIG. 12 is an example of a flow chart of processing by the complementing processing unit of the accumulation server.

FIG. 12 is an example of a flow chart of processing by the complementing processing unit 13 of the accumulation server 1. The flow chart illustrated in FIG. 12 is started when the complementing processing unit 13 is invoked by the intermediate processing unit 12. Additionally, for the sake of convenience in the description, the flow chart illustrated in FIG. 12 is assumed to be performed by the accumulation server A in FIG. 2.

In OP21, the complementing processing unit 13 reads index files which are comparison targets. The complementing processing unit 13 of the accumulation server A reads the index files of the files A and B. Next, the process proceeds to OP22.

The processes from OP22 to OP28 are repeated for the number of TS packets included in the video file which is the target of management of the accumulation server 1, that is, the file A, which is the target of management of the accumulation server A.

In OP22, the complementing processing unit 13 refers to the index file of the file A, and determines whether the sequence number of a TS packet which is a processing target takes a value that is continuous from the sequence number of the immediately preceding TS packet in the file A. In the case where the sequence number of the TS packet which is the processing target takes a value that is continuous from the sequence number of the immediately preceding TS packet in the file A (OP22: NO), no packet loss is detected, and the process is started from OP22 for the next TS packet in the file A.

In the case where the sequence number of the TS packet which is the processing target takes a value that is not continuous from the sequence number of the immediately preceding TS packet in the file A (OP22: YES), packet loss is detected, and the process proceeds to OP23.

In OP23, the complementing processing unit 13 specifies the sequence number which is lost, between the sequence number of the TS packet, in the file A, which is the processing target, and the sequence number of the immediately preceding TS packet in the file A. In the following, the sequence number which is lost will be referred to as the lost sequence number. Additionally, in the case of packet loss during transmission, an RTP packet is lost, and thus a plurality of TS packets are lost. Accordingly, in OP23, the number of sequence numbers of the TS packets included in the lost RTP packet is specified as the lost sequence number. Then, the process proceeds to OP24.

In OP24, the complementing processing unit 13 determines whether the lost sequence number in the file A is present in the index file of the file B. In the case where the lost sequence number in the file A is present in the index file of the file B (OP24: YES), the process proceeds to OP25. In the case where the lost sequence number in the file A is not present in the index file of the file B (OP24: NO), the video packet of the lost sequence number in the file A specified in OP23 is not complemented by the file B, and the process proceeds to OP22 for the next TS packet in the file A.

In OP25, the complementing processing unit 13 acquires, from the file B, the TS packet corresponding to the lost sequence number in the file A specified in OP23. The position of the TS packet, in the file B, corresponding to the lost sequence number is acquired from the offset in the corresponding TS information in the index file of the file B. Next, the process proceeds to OP26.

In OP26, the complementing processing unit 13 adds the TS packet acquired in OP25 in the processing buffer. Next, the process proceeds to OP27.

In OP27, the complementing processing unit 13 determines whether or not there is a space in the processing buffer. For example, a threshold is set for the capacity of the processing buffer, and when the capacity of the processing buffer is below the threshold, the complementing processing unit 13 determines that there is no space in the processing buffer. In the case where there is a space in the processing buffer (OP27: YES), the process proceeds to OP22 for the next TS packet in the file A. In the case where there is no space in the processing buffer (OP27: NO) the process proceeds to OP28.

In OP28, the complementing processing unit 13 adds the TS packet stored in the processing buffer in the complementary file of the file A in the file server A. Then, the process proceeds to OP22 for the next TS packet in the file A.

Figure 13B:
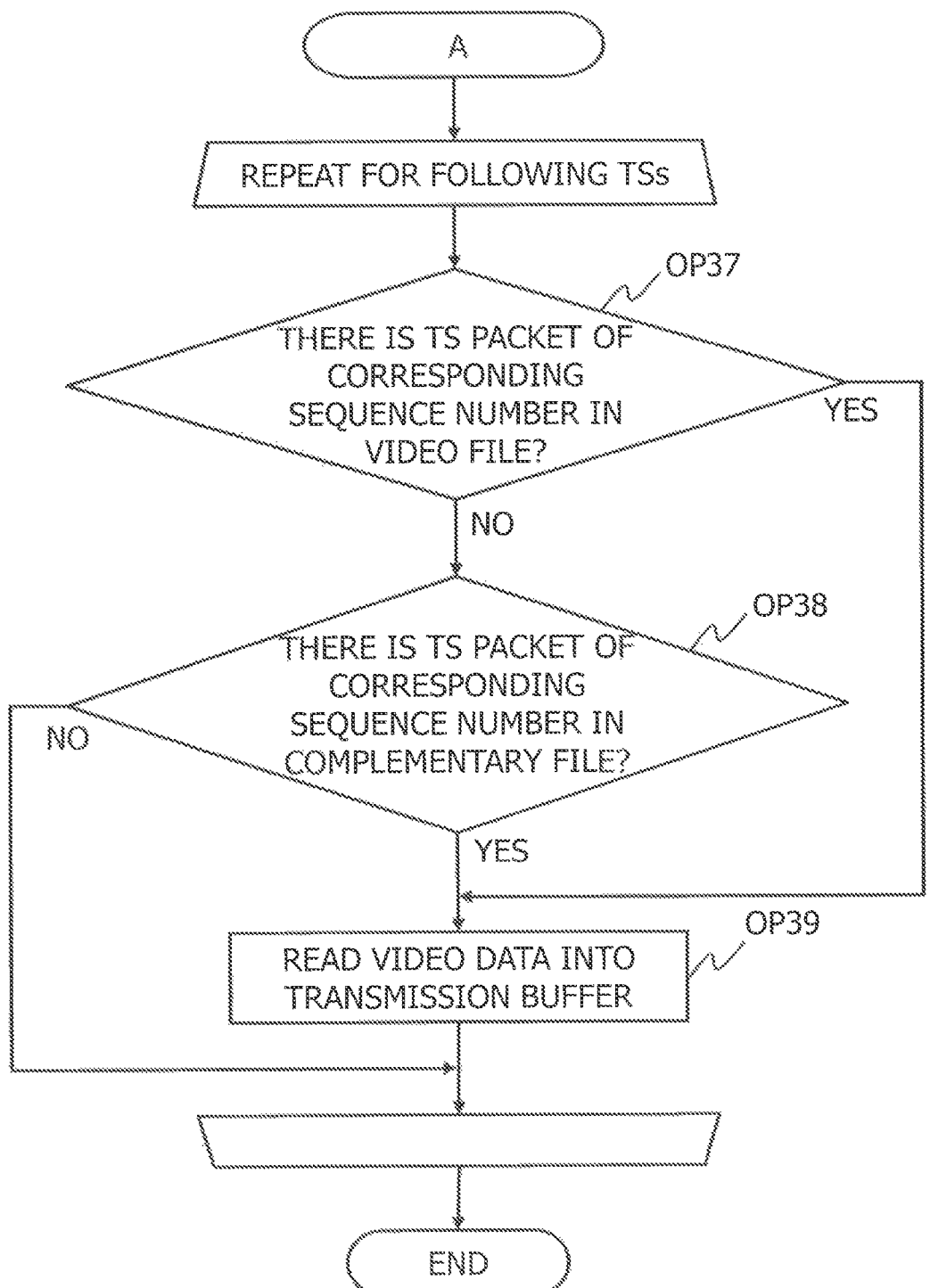
FIG. 13B is an example of a flow chart of processing by the delivery processing unit of the accumulation server.

FIGS. 13A and 13B are examples of a flow chart of processing by the delivery processing unit 14 of the accumulation server 1. The flow charts illustrated in FIG. 13A is started when a delivery request including specification of a reproduction start time is received by the accumulation server 1. In the following, the specified reproduction start time included in the delivery request will be referred to as a specified time.

In OP31, the delivery processing unit 14 reads an index file corresponding to a video file which is a delivery target. Additionally, information at least about the time of recording start of the video data included in the video file is held as metadata, and the video file which is the delivery target may be specified based on the specified time and the information about the time of recording start of the video data. Next, the process proceeds to OP32.

In OP32, the delivery processing unit 14 specifies the read position, in the video file which is the delivery target, corresponding to the specified time, based on the TS time in the index file corresponding to the video file. The TS time indicates the reproduction start time of a TS packet from the beginning of the video file. The delivery processing unit 14 specifies, as the read position, the offset of a TS packet for which the time length of the difference between the specified time and the start time of the video file, and the value of the TS time in the index file match or approximately match each other. Next, the process proceeds to OP33.

In OP33, the delivery processing unit 14 determines whether data at the specified time is present at the read position, in the video file, specified in OP32. This determination is performed based on the timestamps of TS packets in the index file of the video file. In the case where there is a TS packet having the timestamp of the specified time in the video file (OP33: YES), the delivery processing unit 14 acquires the TS packet, and the process proceeds to OP36. In the case where a TS packet having the timestamp of the specified time is not present in the video file (OP33: NO), the process proceeds to OP34.

In OP34, since a TS packet having the timestamp of the specified time is not present in the video file, the delivery processing unit 14 refers to the complementary file corresponding to the video file, and determines whether a TS packet having the timestamp of the specified time is present in the complementary file. In the case where a TS packet having the timestamp of the specified time is present in the complementary file (OP34: YES), the delivery processing unit 14 acquires the TS packet from the complementary file, and the process proceeds to OP36. In the case where a TS packet having the timestamp of the specified time is not present in the complementary file (OP34: NO), the process proceeds to OP35.

In OP35, the delivery processing unit 14 determines whether there is, in the video file, a TS packet corresponding to the time immediately after the specified time. In the case where a TS packet corresponding to the time immediately after the specified time is not present in the video file (OP35: NO), the process returns to OP34, and the delivery processing unit 14 refers to the complementary file. In the case where a TS packet corresponding to the time immediately after the specified time is present in the video file (OP35: YES), the delivery processing unit 14 acquires the TS packet, and the process proceeds to OP36.

In OP36, the delivery processing unit 14 outputs the acquired TS packet to a transmission buffer. The transmission buffer is a FIFO (First In First Out) queue that is created in the main storage device 102. Next, the process proceeds to OP37.

OP37 to OP39 are processes that are repeated for a TS packet having a sequence number immediately after that of the TS packet that is output to the transmission buffer in OP36, and following TS packets.

In OP37, the delivery processing unit 14 determines whether there is data of the corresponding sequence number in the video file. This determination is performed based on the sequence number in the header of the TS packet in the video file. In the case where a TS packet of the corresponding sequence number is present in the video file (OP37: YES), the delivery processing unit 14 acquires the TS packet, and the process proceeds to OP39. In the case where a TS packet of the corresponding sequence number is not present in the video file (OP37: NO), the process proceeds to OP38.

In OP38, since a TS packet of the corresponding sequence number is not present in the video file, the delivery processing unit 14 refers to the complementary file corresponding to the video file, and determines whether a TS packet of the corresponding sequence number is present or not. In the case where a TS packet of the corresponding sequence number is present in the complementary file (OP38: YES), the delivery processing unit 14 acquires the TS packet from the complementary file, and the process proceeds to OP39. In the case where a TS packet of the corresponding sequence number is not present in the complementary file (OP38: NO), the process proceeds to OP37, and the process is performed for the TS packet of the sequence number immediately after the corresponding sequence number.

In OP39, the delivery processing unit 14 outputs the acquired TS packet to the transmission buffer. The process proceeds to OP37, and the process is performed for the TS packet of the sequence number immediately after the corresponding sequence number. The processes from OP37 to OP39 are repeated until a delivery stop request is received from the delivery request source.

The processes in FIGS. 13A and 13B are processes for outputting a TS packet to the transmission buffer. The delivery processing unit 14 also performs processes for reading a TS packet from the transmission buffer, and for transmitting the same to a delivery request source. In the processes for reading a TS packet from the transmission buffer, and for transmitting the same to a delivery request source, the delivery processing unit 14 sequentially transmits TS packets based on the timestamps in the index file, according to the data transmission timings.

Figure 14:
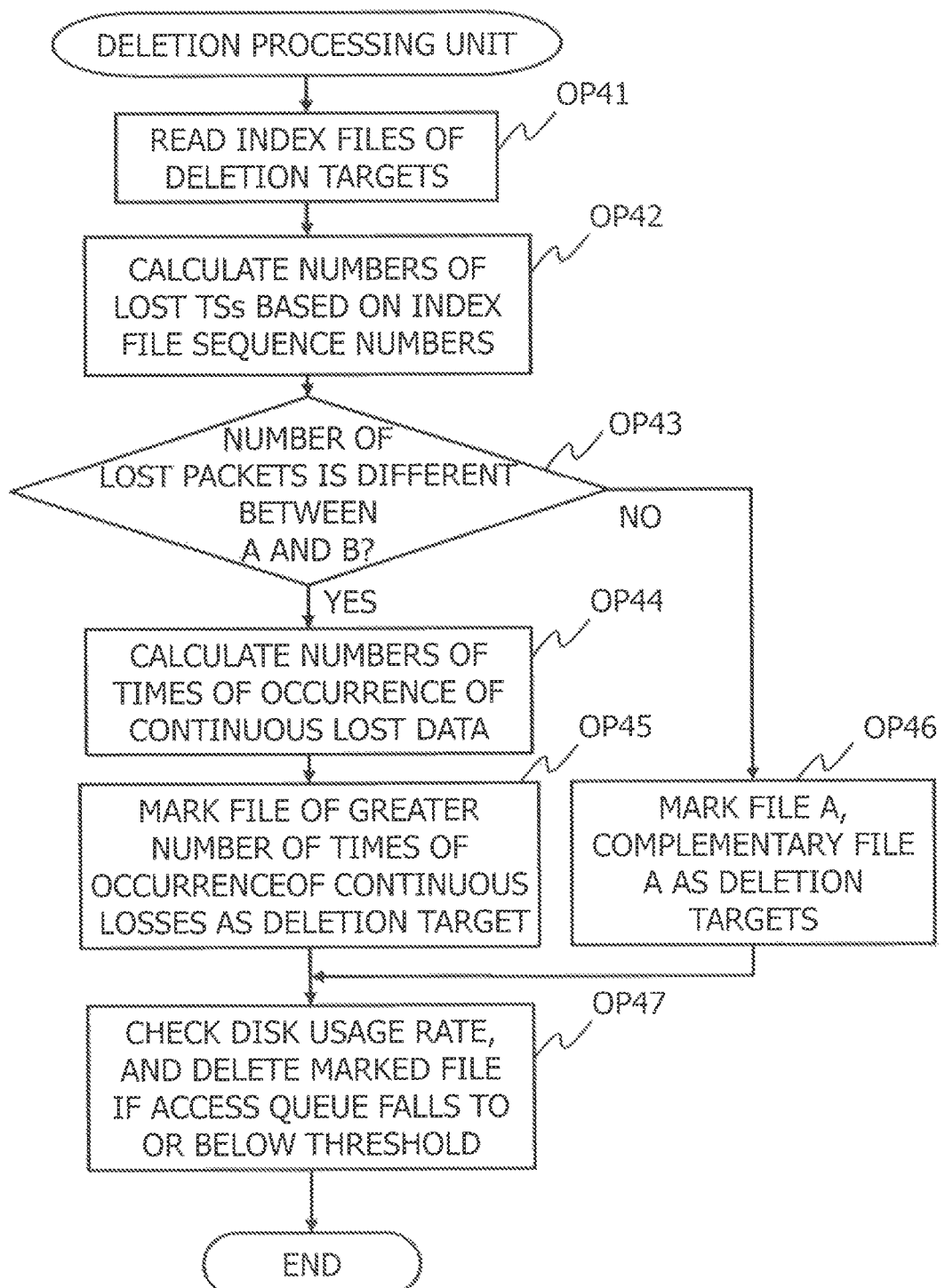
FIG. 14 is an example of a flow chart of processing by a deletion processing unit of the accumulation server.

FIG. 14 is an example of a flow chart of processing by the deletion processing unit 15 of the accumulation server 1. The processing illustrated in FIG. 14 is performed at a predetermined cycle, for example. The predetermined cycle is once an hour or once a day, for example, and is freely set by the administrator.

Additionally, the processing illustrated in FIG. 14 is processing that is performed by the accumulation server 1 that is set as a master. In FIG. 14, the files A and B in FIG. 2 are described as deletion targets for the sake of convenience in the description. Additionally, a video file for which there is a redundant file at the time of start of execution of the processing in FIG. 14 is to be taken as the deletion target. However, a latest file which has not reached the upper limit time length is eliminated from the deletion target.

In OP41, the deletion processing unit 15 reads the index files of the files A and B which are deletion targets. Then, the process proceeds to OP42.

In OP42, the deletion processing unit 15 calculates the number of lost packets for each of the files A and B, based on the sequence numbers in the respective index files. Next, the process proceeds to OP43.

In OP43, the deletion processing unit 15 determines whether the numbers of lost packets coincide with each other between the files A and B. In the case where the numbers of lost packet coincide with each other between the files A and B (OP43: YES), the process proceeds to OP46. In the case where the numbers of lost packets are different between the files A and B (OP43: NO), the process proceeds to OP44.

OP44 and OP45 are processes for a case where the numbers of lost packets are different between the files A and B. In OP44, the deletion processing unit 15 calculates, for each of the files A and B, the number of times of occurrence of continuous lost TS packets. Next, the process proceeds to OP45.

In OP45, the deletion processing unit 15 marks, as the deletion targets, the video file of a greater number of times of occurrence of continuous lost TS packets and the complementary file of the video file. This is because, in the first embodiment, the video quality is assumed to be reduced as the number of times of occurrence of continuous lost TS packets becomes greater. That is, the deletion processing unit 15 keeps the file with higher video quality. Next, the process proceeds to OP47.

In OP46, since the numbers of lost packets coincide with each other between the files A and B, the video file managed by the owner device, which is the master, and the complementary file of the video file are marked as the deletion targets. Then, the process proceeds to OP47.

In OP47, the deletion processing unit 15 checks the disk usage rate, and in the case where the size of an access queue, which is a queue waiting for access to the file server 2 storing files, falls to or below a predetermined threshold, the deletion processing unit 15 deletes the marked files. Then, the processing illustrated in FIG. 14 is ended.

<Effects of First Embodiment>

In the first embodiment, for example, the accumulation server A acquires a lost packet of the file A from the file B, which is a redundant file of the file A, and creates a complementary file for the file A. In the same manner, the accumulation server B acquires a lost packet of the file B from the file A, and creates a complementary file for the file B. Accordingly, the number of lost packets may be reduced and data of higher video quality may be achieved for both the files A and B, and the influence of packet loss during transmission may be reduced. Reliability of the video data may thus be increased.

Also, the accumulation server 1 creates a complementary file separately from the video file instead of inserting, into the portion of the lost packet of the video file, a video packet, corresponding to a lost packet, acquired from another video file. Accordingly, an increase in the processing load on the accumulation server 1 may be suppressed.

In the first embodiment, the complementing processing unit 13 is invoked and its operation is started when hash data of a video file and hash data of another video file which is a redundant file do not coincide with each other. Therefore, in the case where pieces of hash data of two files coincide with each other, the complementing processing unit 13 does not operate, and operation of the complementing processing unit 13 may be further reduced, and the processing load on the accumulation server 1 may be suppressed.

Also, in the first embodiment, the amount of storage used for storing video files may be reduced by the accumulation server 1 set as the master deleting redundant video files.

Furthermore, in the first embodiment, the accumulation server 1 set as the master deletes redundant files when the size of an access queue according to the disk usage rate is at or below a threshold, and thus influence on other processes by deletion of files may be suppressed.

According to one aspect, reduction in the quality of video data due to a packet loss during transmission of the video data may be suppressed.

<Others>

In the first embodiment, the encoder 50 encodes video data by MPEG, but this is not restrictive, and video compression standards that use TS packets, such as H265 and H264 may also be used instead of MPEG.

In the first embodiment, lost packets are complemented on a per TS packet basis, but this is not restrictive, and lost packets may also be complemented on a per RTP packet basis. In the case where lost packets are to be complemented on a per RTP basis, the index file includes RTP information about an RTP packet instead of the TS information, which is information about a TS packet. Like the TS information, the RTP information includes a reproduction start time from the beginning of a video file, a sequence number, offset position information, a timestamp and the like. In this case, the RTP packet is an example of a "video packet".

In the first embodiment, a system is described where a redundant configuration is achieved by two accumulation servers A and B, but the technology described in the first embodiment may also be applied to a system where the redundant configuration is achieved by three or more accumulation servers. In the case where the technology described in the first embodiment is applied to a system where the redundant configuration is achieved by three or more accumulation servers, the following will be true.

In the processing by the intermediate processing unit 12 illustrated in FIG. 11, the number of pieces of hash data which are comparison targets is made three or more. In OP12 in FIG. 11, the complementing processing unit 13 is invoked if there is even one piece of hash data that does not coincide among the three or more pieces of hash data which are comparison targets.

Also, when assuming a case where there are accumulation servers A, B and C, and where the servers manage respective files A, B and C, the following will be true for the processing by the complementing processing unit 13 in FIG. 12. The accumulation server A determines whether a lost packet of the file A is present in the file B or the file C. In the case where the lost packet of the file A is present in both the file B and the file C, a TS packet corresponding to the lost packet is acquired from the file with a smaller number of times of occurrence of continuous lost packets. In the case where the lost packet of the file A is present in one of the files B and C, a TS packet corresponding to the lost packet is acquired from the file having the lost packet of the file A.

Also, the accumulation server A may successively perform the processing in FIG. 12 for combinations of the file A and the file B, and the file A and the file C. For example, the accumulation server A acquires a lost packet of the file A from the file B by the first execution of the processing in FIG. 12, and acquires by the second execution of the processing in FIG. 12, from the file C, a lost packet of the file A which was not acquired from the file B.

In the first embodiment, the accumulation server 1 performs the processing by the accumulation unit 11, the intermediate processing unit 12, the complementing processing unit 13, the delivery processing unit 14, and the deletion processing unit 15. However, this is not restrictive, and the processing by the accumulation unit 11, the intermediate processing unit 12, the complementing processing unit 13, the delivery processing unit 14, and the deletion processing unit 15 may alternatively be performed by different servers. That is, the video data accumulation system may include an accumulation server, an intermediate processing server, a complementing processing server, a delivery server, and a deletion processing server corresponding respectively to the accumulation unit 11, the intermediate processing unit 12, the complementing processing unit 13, the delivery processing unit 14, and the deletion processing unit 15.

<Recording Medium>

A program for causing a computer and other machines and devices (hereinafter "computer or the like") to achieve any of the functions described above may be recorded in a recording medium that can be read by the computer or the like. The function may be provided by causing the computer or the like to read and execute the program in the recording medium.

Here, the recording medium that can be read by a computer or the like is a non-transitory recording medium that is capable of accumulating information such as data and programs electrically, magnetically, optically, mechanically or chemically, and that can be read by a computer or the like. Of such recording media, those that can be detached from the computer or the like include a flexible disk, a magneto-optical disk, a CD-ROM, a CD-R/W, a DVD, a Blu-ray disk, a DAT, an 8-mm tape, and a memory card such as a flash memory, for example. Also, recording media fixed to the computer or the like include a hard disk, a ROM (Read Only Memory), and the like. Moreover, an SSD (Solid State Drive) may be used as a recording medium that can be detached from the computer or the like, or as a recording medium that is fixed to the computer or the like.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A video data processing apparatus comprising:
   a processor configured to execute a process including:
   creating a file including video packets received from a video source;
   creating an index file including a sequence number and offset position information, indicating a position in the created file, of each of the video packets included in the created file; and
   creating, when there is a loss of a first video packet in the created file, complementary data by acquiring a video packet corresponding to the first video packet from a redundant file of the created file based on the index file of the created file and an index file of the redundant file, the complementary data complementing the loss of the first video packet, and the redundant file including video packets received from the video source by a path different from a path by which the video packets included in the created file are received.

2. The video data processing apparatus according to claim 1, the process further comprising:
   creating hash data based on the created file; and
   comparing pieces of hash data of the created file and the redundant file,
   wherein the complementary data is created when the pieces of hash data do not coincide with each other.

3. The video data processing apparatus according to claim 1, the complementary data is held as a file that is different from the created file.

4. The video data processing apparatus according to claim 1, the process further comprising reading a video packet from the created file, that reads a lost video packet of the created file from the complementary data, and that transmits the read video packet to a predetermined destination.

5. The video data processing apparatus according to claim 4,
   wherein each of the video packets includes a timestamp representing a time of creation,
   wherein the index file also including a timestamp of each of the video packets, and
   wherein based on the index file, a position of a video packet is specified, in the created file, corresponding to a time specified in a delivery request, and transmission is performed from a video packet of the specified position.

6. The video data processing apparatus according to claim 1, the process further comprising deleting a file of poorer video quality between the created file and the redundant file.

7. The video data processing apparatus according to claim 6, wherein from the index files, a number of times of occurrence of continuous lost video packets of each of the created file and the redundant file are calculates, and a file of a greater number of times of occurrence of continuous lost video packets is deleted as the file of poorer video quality.

8. The video data processing apparatus according to claim 1, wherein the video packets are transmitted by using UDP.

9. The video data processing apparatus according to claim 1, wherein the video packets are created by encoding, by a predetermined video compression or expansion method, video data acquired by a video source.

10. A video data processing system comprising:
    a first processor configured to execute a process creating a file including video packets received from a video source;
    a second processor configured to execute a process creating an index file including a sequence number and offset position information, indicating a position in the created file, of each of the video packets included in the created file; and
    a third processor configured to execute a process creating, when there is a loss of a first video packet in the created file, complementary data by acquiring a video packet corresponding to the first video packet from a redundant file of the created file based on the index file of the created file and an index file of the redundant file, the complementary data complementing the loss of the first video packet, and the redundant file including video packets received from the video source by a path different from a path by which the video packets included in the created file are received.

11. A video data processing method to be performed by a computer, the video data processing method comprising:
    creating a file including video packets received from a video source;
    creating an index file including a sequence number and offset position information, indicating a position in the created file, of each of the video packets included in the created file; and
    creating, when there is a loss of a first video packet in the created file, complementary data by acquiring a video packet corresponding to the first video packet from a redundant file of the created file based on the index file of the created file and an index file of the redundant file, the complementary data complementing the loss of the first video packet, and the redundant file including video packets received from the video source by a path different from a path by which the video packets included in the created file are received.

12. A non-transitory computer-readable recording medium recording a video data processing program that causes a computer to execute:

creating a file including video packets received from a video source;

creating an index file including a sequence number and offset position information, indicating a position in the created file, of each of the video packets included in the created file; and creating, when there is a loss of a first video packet in the created file, complementary data by acquiring a video packet corresponding to the first video packet from a redundant file of the created file based on the index file of the created file and an index file of the redundant file, the complementary data complementing the loss of the first video packet, and the redundant file including video packets received from the video source by a path different from a path by which the video packets included in the created file are received.

\* \* \* \* \*